United States Patent [19]

Nix et al.

[11] Patent Number: 4,936,409
[45] Date of Patent: Jun. 26, 1990

[54] BATTERY HOLD DOWN DEVICE

[76] Inventors: Charles D. Nix, 1578 Slaughter Rd., Madison, Ala. 35758; Johnny P. Baker, 782 Burwell Rd., Harvest, Ala. 35749; William F. Huntley, 206 Wellington Rd., Athens, Ala. 35611

[21] Appl. No.: 393,293

[22] Filed: Aug. 14, 1989

[51] Int. Cl.⁵ .............................................. B60R 18/02
[52] U.S. Cl. .................................. 180/68.5; 206/335; 248/503
[58] Field of Search ...................... 180/68.5; 206/335; 248/309.1, 300, 503

[56] References Cited

U.S. PATENT DOCUMENTS

| 1,052,449 | 2/1913 | Beck | 180/68.5 |
| 4,367,572 | 1/1983 | Zielenski | 180/68.5 |
| 4,529,053 | 7/1985 | Tucker | 180/68.5 |

Primary Examiner—Charles A. Marmor
Assistant Examiner—Richard Camby
Attorney, Agent, or Firm—John C. Garvin, Jr.

[57] ABSTRACT

A hold down apparatus for clamping a battery within a motorized vehicle for preventing movement thereof particularly during sudden accelerations and decelerations of the vehicle. The hold down apparatus includes a non-metallic tray mounted to the motorized vehicle and a strap having a two-part quick disconnect buckle for anchoring a battery within the tray.

12 Claims, 2 Drawing Sheets

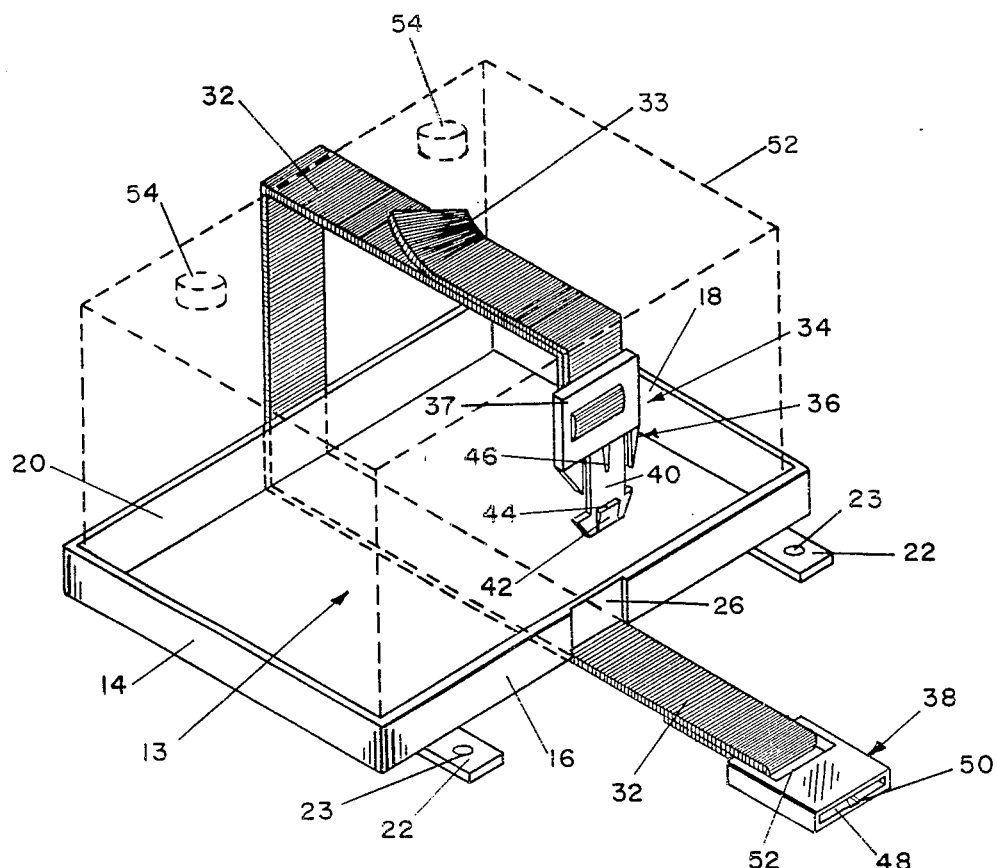
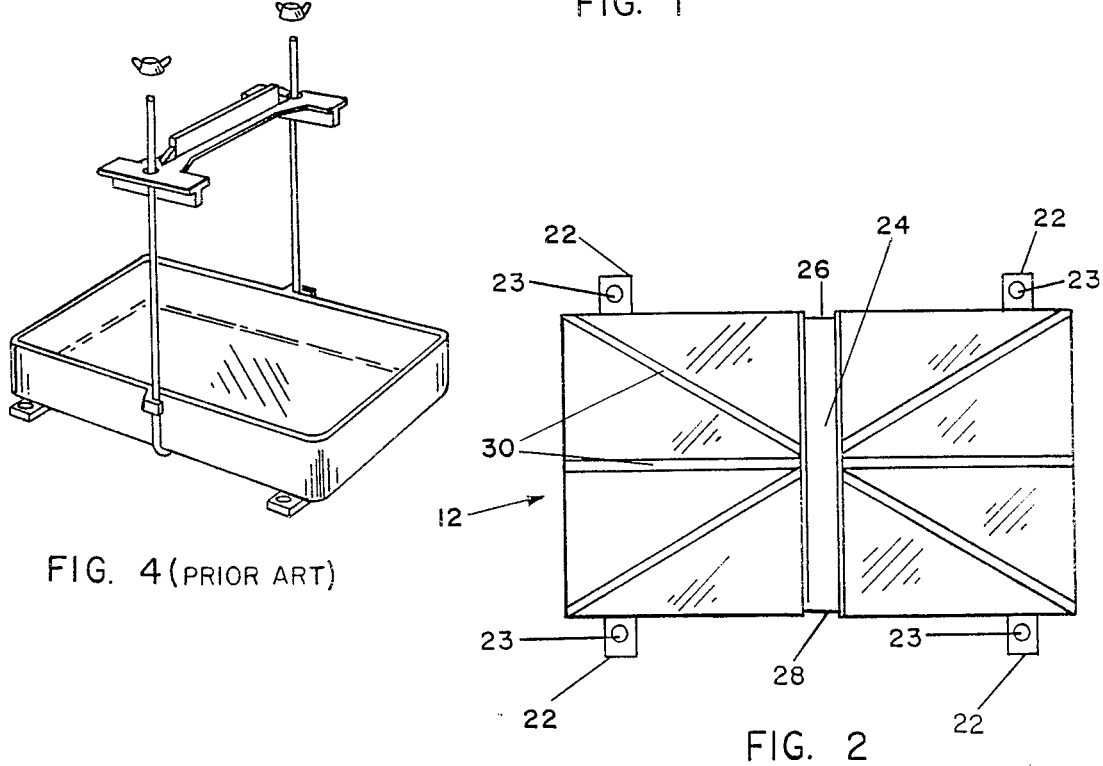
FIG. 1
FIG. 4 (PRIOR ART)
FIG. 2

BATTERY HOLD DOWN DEVICE

TECHNICAL FIELD

This invention relates to a clamping apparatus, and more particularly to that class of apparatus useful as a battery tie down device. The present invention has application in all situations wherein a battery should be tied down to prevent movement thereof, but it has particular application for tying down batteries in boats, automobiles, trucks, and other vehicles which are subject to sudden accelerations and decelerations.

BACKGROUND OF THE INVENTION

The prior art abounds with apparatuses useful for retaining devices such as batteries and the like. The most conventional of all such prior art devices comprises a metal tray anchored to the frame or floor of a vehicle for supporting the battery, a metallic cover for fitting over and engaging the top of the battery, and two metallic rods each having a hook at its lower end for engaging the walls of openings in opposite edges of the tray and being threaded at its upper end for insertion through an opening in the cover for receiving a nut, which when tightened, closes the cover against the top of the battery to anchor the battery to the tray and the frame or floor of the vehicle. The cover, in this most conventional prior art device, is either a metallic cross piece that straddles the battery between its cell groups or is a rectangular metallic member having a large rectangular opening in its center which forms a L-shaped cross-sectional border on its outer edges for surrounding and engaging the upper edges of the battery. The principal disadvantage of most such prior art devices is that the metal parts corrode when coming in contact with the acid electrolyte of the battery.

U.S. Pat. No. 4,367,572 discloses a tie down device for a battery comprising a rectangular tray for supporting the battery, two openings in opposed edges of the rectangular tray, and an elastic hold down member having a hook adjacent each of its ends for insertion into the openings of the tray to engage the walls of each opening. In use, the battery is placed into the tray, a hook on one end of the elastic member is inserted into one opening in said tray, the elastic member is stretched up the side of the battery, over the top of the battery between its cell groups, and down the other side of the battery where the other hook is inserted into the other opening in the tray to engage the walls of the opening, thus securing the battery to the tray.

There have also been prior art devices which include a container for housing a battery within a vehicle, which container has bottom and top portions secured together by a belt wrapped around the container. U.S. Pat. Nos. 1,052,449 and 3,437,164 are exemplary of such prior art devices.

The instant invention relates to a clamping apparatus made substantially of non-metallic material for holding down a battery in a motorized vehicle such as a boat, automobile or truck to prevent the battery from moving particularly during sudden accelerations and decelerations, which overcomes the disadvantages of the prior art devices.

An object of the present invention is to provide a clamping apparatus primarily adapted to hold down devices, such as batteries in motorized vehicles, in an effective, efficient, and economical manner.

Another object of the invention is to provide a hold down apparatus which engages the device to be held down in a manner such that the device cannot move about.

A still further object of the invention is to provide a hold down apparatus which is substantially entirely non-metallic, and impervious to the acid electrolyte of the battery thereby precluding corrosion of the hold down apparatus.

Another further object of the invention is to provide a hold down apparatus for devices, such as batteries for use in motorized vehicles, which is easy to install and maintain and permits ready and quick removal or replacement of the device being held down.

These objects as well as other objects of the present invention will become more readily apparent after reading the following description in conjunction with the accompanying drawings.

BRIEF DESCRIPTION OF THE DRAWINGS

FIG. 1 is a perspective view of the hold down apparatus of the present invention with the buckle of the strap in an unbuckled condition.

FIG. 2 is a bottom elevational view of the base or tray of the hold down apparatus of the present invention.

FIG. 4 is a perspective view of the most common of all prior art battery hold down devices.

DESCRIPTION OF THE PREFERRED EMBODIMENT

Figure 3:
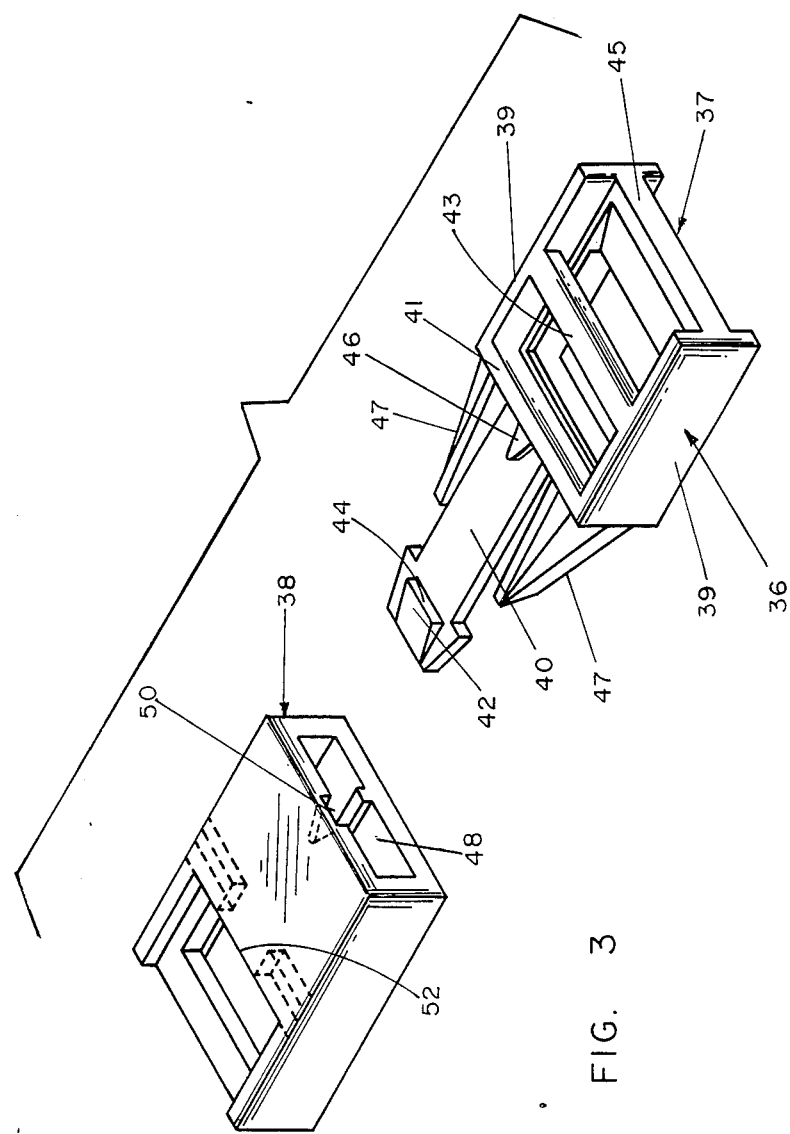
FIG. 3 is a plan view of a separable buckle utilized with the present invention.

The prior art devices generally clamp the battery and prevent movement thereof through rigid metallic elements. Thus, on shock of large magnitude, the upper edges of the battery are subjected to substantial stresses which might cause the casing of the battery to crack. In prior art devices, acid electrolyte from the battery often comes into contact with the metallic elements to cause the metallic elements to corrode.

The present invention contemplates the above mentioned and other deficiencies of prior art devices and also considers the desirability of providing a battery hold down device which permits the installation and removal of a battery from a motorized vehicle quickly and without the use of tools. The present invention relates to a battery hold down device which may be manufactured inexpensively, is durable, and useful for its purpose.

FIG. 1 illustrates, by way of example, the preferred embodiment of the invention having a battery mounted therein in an unbuckled or unrestrained condition. FIG. 2 illustrates, by way of example, the preferred embodiment of the tray or base of the present invention.

Now referring to the drawings, the present invention comprises a tray 12, a strap 32, and a two-part quick disconnect buckle 34 attached to strap 32. The tray 12 is shown as supporting a battery, depicted by dotted lines 52, and is molded from any suitable plastic material, such as polypropylene or polycarbonate which resists or is not affected by battery acid. Tray 12 includes a base 13, upstanding side walls 14, 16, 18 and 20, a plurality of projections 22 extending from the base 13, each having an opening 23 therein, a horizontal groove 24 (FIG. 2) extending between side walls 16 and 20 of tray 12, vertical grooves 26 and 28 in side walls 16 and 20 of tray 12 in communication with horizontal groove 24 of tray 12, and a plurality of structural ribs 30 on the bottom of base 13.

The strap 32 for clamping battery 52 to tray 12 is made from any suitable material, such as polypropylene, which is not subject to corrosion by battery acid. Strap 32 has a two-part quick disconnect buckle 34 associated therewith, made of any suitable material, such as polypropylene, which is not subject to corrosion by battery acid, and comprises a male connection member 36 and a female receptacle member 38. The female receptacle member 38 is fixed to one end of strap 32 and comprises a generally rectangular opening 48, a guide groove 50, and a latch aperture 52. Male connection member 36 comprises a frame like body portion 37 defined by sides 39 which are interconnected by a plurality of transversely extending bars 41, 43 and 45, a flexible arm 40 connected to bar 41 having on its upper surface a tapered locking portion 42 and a locking extension 44 on its free end and a guide protrusion 46 adjacent bar 41. Male connection member 36 further includes two side guide members 47 extending from bar 41 for stabilizing the buckle when male connection member 36 and female receptacle 38 are engaged. The free end 33 of strap 32 is fed around center bar 43 to slidably mount male member 36 on strap 32. The terminals of the battery are designated by dotted lines 54.

The tray 12 of the battery hold down device is mounted to a motorized vehicle through use of any conventional means, such as screws or bolts inserted through openings 23 of projections 22 extending from tray 12. Prior to anchoring tray 12 to the motorized vehicle, strap 32 is placed within horizontal groove 24 of tray 12. Alternatively, strap 32 may be secured within horizontal groove 24 in the bottom of tray 12 by any conventional means, such as glue.

In operation, battery 52 is placed into tray 12, the free end 33 of strap 32 is pulled upward such that strap 32 is centered within vertical groove 28 of tray 12 and wrapped up one side of battery 52 and around the top upper edge of battery 52 so that it rests upon the top surface of battery 52 between the two cell groups, the female receptacle member 38 fixed to one end of strap 32 is pulled upward such that strap 32 centers itself within vertical groove 26 and engages the other side of battery 52 until the female receptacle member 38 is brought within the proximity of male connection member 34 at which time arm 40 of male connection member 34 is inserted and pushed into opening 48 of female receptacle member 38, thus depressing locking portion 42 and locking extension 44 on flexible arm 40 of male connection member 34, until locking portion 42 and locking extension 44 snap into opening 52 of female receptacle member 38 to interlock the male and female members 36 and 38. A simple pull upon free end 33 of strap 32 tightens the strap around battery 52 causing bar 45 to bite into strap 32 to secure battery 52 within tray 12 and to the motorized vehicle.

While the above description constitutes the preferred embodiment of the present invention, it will be appreciated that the invention is susceptible to modification, variation and change without departing from the proper scope and fair meaning of the accompanying claims.

I claim:

1. An apparatus for holding down and anchoring a battery in a motorized vehicle, said apparatus comprising:
   a. a non-metallic tray for supporting said battery, said tray including a base portion, a pair of spaced side and end upstanding flange portions extending from said base portion at 90 degree angles therefrom, said base portion including a horizontal groove extending between said two side upstanding flange portions and each of said two side upstanding flange portions including a vertical groove in communication with said horizontal groove, and a plurality of projections extending from said base portion in the same plane as said base portion, each of said projections having an opening therein for receiving means for anchoring said tray to said motorized vehicle;
   b. a non-metallic hold down strap having a first buckle member fixed at one end and a second buckle member slidably mounted on said strap adjacent a second end of said strap, said strap being adapted to be wrapped around said tray and said battery to secure said battery to said tray and said motorized vehicle when said first buckle member is interlocked with said second buckle member.

2. The apparatus of claim 1 wherein said base portion includes a plurality of structural ribs therein.

3. The apparatus of claim 2 wherein said strap comprises a material impervious to acid electrolyte.

4. The apparatus of claim 3 wherein said material for said strap is polypropylene.

5. The apparatus of claim 4 wherein said first buckle member comprises a generally rectangular opening, a guide groove in the wall of said rectangular opening, and latching means in communication with said generally rectangular opening.

6. The apparatus of claim 5 wherein said second buckle member comprises a frame-like body portion, a plurality of transversely extending bars, an arm extending from one of said transversely extending bars, a latching element on the upper surface of the free end of said arm, a guide protrusion on the upper surface of said arm, and side guide members extending from said one of said transversely extending bars.

7. The apparatus of claim 6 wherein said latching element on the free end of said arm of said second buckle member is adapted to be flexed inwardly when inserted into said generally rectangular opening of said first buckle member and spring outwardly when reaching said latching means of said first buckle member to thereby interlock said first buckle member to said second buckle member.

8. The apparatus as in claim 7 wherein said tray is rectangular and said structural ribs include a first rib member extending diagonally between a first pair of corners of said rectangular tray, a second rib member extending diagonally between a second pair of corners of said rectangular tray, and, a third rib member extending between opposite ends of said rectangular tray, said rib members being discontinuous at said horizontal groove.

9. An apparatus for holding down and anchoring a battery in a motorized vehicle, said apparatus comprising:
   a. a non-metallic rectangular tray for supporting said battery, said tray comprising a base portion having an upper surface and a lower surface, said lower surface having a horizontal groove and a plurality of structural ribs therein, a pair of spaced side and end flange portions extending from said base portion at 90 degree angles therefrom, each of said side portions including a vertical groove in communication with said horizontal groove, said plurality of structural ribs extend from the edges of said horizontal groove to the outer edges of said rectangular tray, and a plurality of projections extending from said base portion in the same plane as said base portion, each of said projections having an opening therein for receiving means for anchoring said tray to said motorized vehicle;

b. a non-metallic hold down strap having a first buckle member fixed at one end of said strap and a second buckle member slidably mounted on said strap adjacent a second end of said strap, said strap comprising a polypropylene material impervious to acid electrolyte, said first buckle member comprising a generally rectangular opening, a guide groove in the wall of said rectangular opening, and latching means in communication with said generally rectangular opening, said second buckle member comprising a frame-like body portion, a plurality of transverse bars, an arm extending from one of said transverse bars, a latching element on the upper surface of the free end of said arm, a guide protrusion on the upper surface of said arm, and side guide members extending from said one of said transverse bars, said latching element on the free end of said arm of said second buckle member being adapted to flex inwardly when inserted into said generally rectangular opening of said buckle member and spring outwardly when reaching said latching means of said first buckle member to interlock said first buckle member to said second buckle member, said strap being adapted to be wrapped around said tray in said horizontal groove and said vertical grooves and said battery to secure said battery to said tray and said motorized vehicle when said first buckle member is interlocked with said second buckle member.

10. An apparatus for holding down and anchoring a battery in a motorized vehicle, said apparatus comprising:

a. a non-metallic tray for supporting said battery, said tray including a base portion, a pair of spaced side and end upstanding flange portions extending from said base portion at 90 degree angles therefrom, a plurality of projections extending from said base portion in the same plane as said base portion, each of said projections having an opening therein for receiving means for anchoring said tray to said motorized vehicle, and groove means within the underside of said base portion of said tray;

b. a non-metallic hold down strap having a first buckle member fixed at one end and a second buckle member slidably mounted on said strap adjacent a second end of said strap, said strap being placed within said groove means and wrapped around said tray and said battery to secure said battery to said tray and said motorized vehicle when said first buckle member is interlocked with said second buckle member.

11. The apparatus of claim 10 wherein said groove means include a horizontal groove in said base portion extending between said pair of spaced side and upstanding flange portions.

12. The apparatus of claim 10 wherein said groove means include vertical grooves in each of said spaced side and upstanding flange portions.

* * * * *